Figure 1:
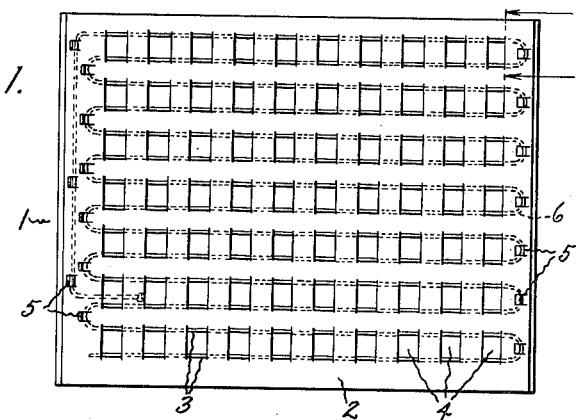

Sept. 14, 1954 H. S. MALUTICH 2,688,794
METHOD OF MAKING HEAT EXCHANGE APPARATUS
Filed June 1, 1951

Inventor
Harry S. Malutich
by William B. Edwards, Jr.
His Attorney.

Patented Sept. 14, 1954

2,688,794

UNITED STATES PATENT OFFICE 2,688,794

METHOD OF MAKING HEAT EXCHANGE APPARATUS

Harry S. Malutich, Erie, Pa., assignor to General Electric Company, a corporation of New York Application June 1, 1951, Serial No. 229,340

4 Claims. (Cl. 29—157.3)

My invention relates to heat exchange apparatus and more particularly to condensers for refrigerators and the like and the method for making the same.

Plate or sheet type condensers are well known in refrigeration art, and usually these condensers consist of essentially two elements, namely a sheet of relatively good heat-conducting material and a continuous serpentine tubing formed so that the convolutions or passes lie in a single plane. Such a condenser is assembled by mounting the serpentine tubing upon the sheet so that there is good thermal contact between the tubing and the condenser sheet. The chief advantage inherent in condensers constructed along these lines is that the relatively large surface area of the sheet is available for heat dissipation. It is obvious, therefore, that before such a condenser will operate efficiently it is necessary that there be good thermal contact between the serpentine tubing and the condenser sheet. Prior art methods of obtaining such a contact include the use of brazing or welding operations. While these operations are satisfactory insofar as producing the required thermal contact is concerned, they are objectional from an economic standpoint since they tend to increase the cost of manufacturing the condenser. I have, however, developed a method for making sheet or plate type condensers in which the necessity of welding or brazing operations is eliminated. At the same time, I am able to retain an intimate thermal contact between the serpentine tubing and the condenser sheet. In assembling a condenser of this type by my new and improved method the serpentine tubing is supported in place upon the sheet by portions of the sheet material itself, and these portions are formed or bent into intimate contact with the tubing thereby creating the requisite thermal contact. The serpentine tubing of my condenser is, therefore, mechanically bonded to the condenser sheet, and the resulting structure is extremely simple and is assembled quickly and easily with a minimum amount of manufacturing cost.

Accordingly, it is an object of my invention to provide a plate or sheet type heat exchange apparatus with an improved arrangement for mechanically bonding the tubing to the condenser sheet.

It is a further object of my invention to provide a new and improved method for assembling a plate or sheet type heat exchange apparatus including an improved arrangement for bonding the tubing to the condenser sheet by portions formed from the sheet itself.

Further objects and advantages of my invention will become apparent as the following description proceeds and the features of novelty which characterize my invention will be pointed out with particularity in the claims annexed to and forming a part of this specification.

In carrying out the objects of my invention, a sheet of heat-conducting material is slit and formed to provide a plurality of aligned raised portions, and a section of preformed serpentine tubing is inserted as a unit from one end into the spaces between the body of the sheet and these aligned raised portions. The raised portions are then pressed back into the plane of the sheet to provide heat exchange contact between the tubing and sheet over a substantial area.

Figure 2:
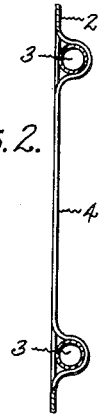
Figure 3:
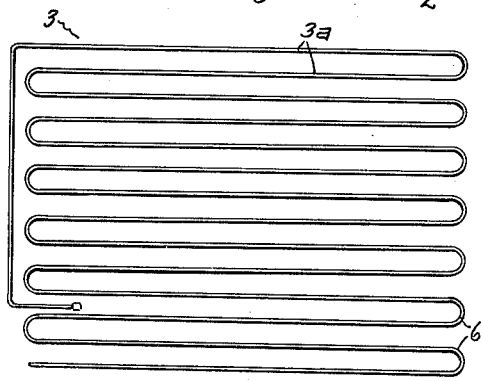
Figure 4:
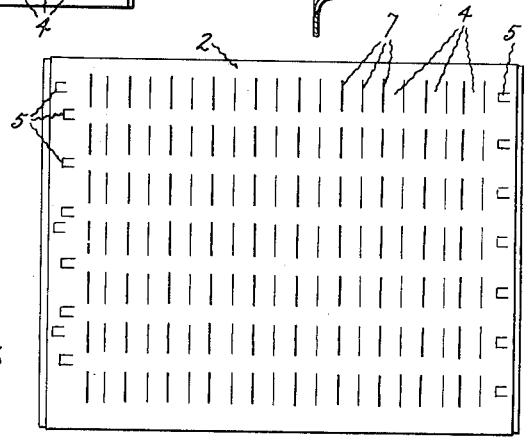
Figure 5:
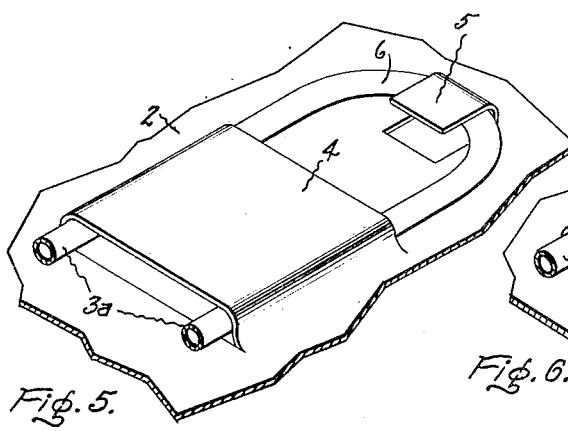
Figure 6:
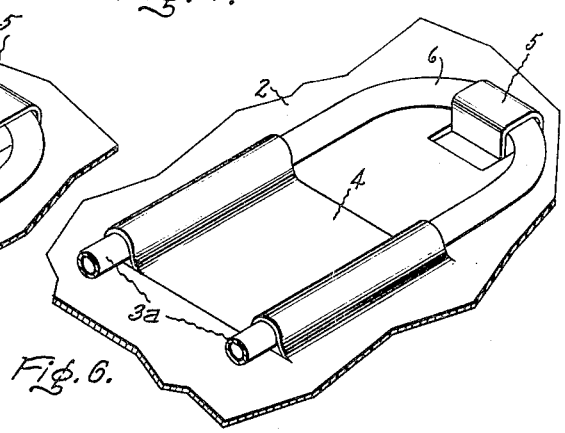

For a better understanding of my invention reference may be had to the accompanying drawings in which Fig. 1 is an elevation view of a heat exchange apparatus made in accordance with my invention; Fig. 2 is an enlarged cross-sectional view along lines 2—2 of Fig. 1; and Figs. 3 through 6 illustrate the various steps embodied in my invention. Specifically Fig. 3 is a plan view of a preformed serpentine tubing; Fig. 4 is a plan view of the condenser sheet upon which the tubing is to be mounted and illustrates the configuration and position of the supporting elements formed on the sheet; Fig. 5 is a perspective view showing a portion of the serpentine tubing after it has been inserted in position upon the condenser sheet; and Fig. 6 is a perspective view showing a portion of the tubing in place upon the condenser sheet and illustrates the final step in the assembling process.

In Fig. 1 I have shown a heat exchange apparatus 1 made in accordance with my improved method of manufacture. A relatively large plate or sheet 2 is formed of good heat-conducting material, and continuous serpentine tubing 3 is mounted upon the sheet 2 and in good thermal contact therewith. The purpose of mounting the tubing 3 in heat exchange contact with a relatively large sheet of heat-conducting material is to provide the tubing with a large surface area from which heat may be dissipated. It is obvious, however, that if the condenser or heat exchange apparatus is to operate efficiently there must exist an extremely good thermal contact between the sheet 2 and the tubing 3. To this end, I provide a series of rows of parallel strap-like members 4 formed from the body of the sheet 2 which serve to support the tubing 3 in contact with the sheet and to afford intimate thermal contact between the sheet and the tubing. I also provide additional support for the tubing by forming a plurality of clip-like members 5 along each of two opposite ends of the sheet 2. The members 5 are positioned so as to engage return bends 6 of the serpentine tubing 3. These clip-like members 5, like the members 4, are formed from the sheet material. The manner of forming both the strap-like members 4 and the clip-like members 5 will be described below in subsequent portions of this specification.

Fig. 2, which is a cross-sectional view along lines 2—2 of Fig. 1, illustrates the manner in which the intimate thermal contact between the condenser sheet 2 and the tubing 3 is accomplished. The strap-like members 4 which support the tubing upon the sheet are bent so as to be in intimate contact with a large portion of the surface of the tubing 3. As shown in Fig. 2, this area of contact between the strap-like members 4 and the tubing is slightly greater than half the circumference of the tubing. This contact results from bending or forming the strap-like members 4 around the tubing 3. The resulting structure not only insures intimate thermal contact between these members but also provides the necessary support for holding the tubing 3 upon the sheet 2. In Figs. 3 through 6 I have illustrated the various steps embodied in my invention. These figures show in chronological sequence the manner in which a sheet or plate type condenser is formed by my improved arrangement of mechanically bonding a preformed serpentine tubing to a condenser sheet. Referring first to Fig. 3, I have shown a preformed serpentine tubing 3 which is to be mounted upon a condenser sheet. This tubing comprises a continuous tube bent into a plurality of horizontal passes 3a. These horizontal passes are positioned one above the other in a single plane, and are connected at their extremities by return bends 6. This tubing is formed of copper or other suitable material having the desirable heat-conducting properties, and is adapted to convey fluid material such as the refrigerants normally used in refrigeration apparatus.

In Fig. 4 I have shown the condenser sheet 2 upon which the tubing 3 is to be mounted. This sheet is formed of good heat-conducting material. Prior to mounting the tubing a plurality of parallel slits 7 are formed in the sheet. These slits are arranged in a series of parallel rows, and are of a length slightly greater than the distance between adjacent passes of the tubing 3. After the slits have been formed the portions of the sheet between adjacent slits are raised from the plane of the sheet to form the strap-like members 4 providing unobstructed aligned openings between the raised portions and the sheet. The aligned unobstructed openings are of sufficient length to permit the insertion of adjacent passes 3a of the tubing 3. It is thus possible to preform the tubing into the shape illustrated and to insert the preformed tubing as a unit into these openings from one end of the sheet.

Also in Fig. 4 I have indicated the forming of a plurality of clip-like members 5 at each of two opposite ends of the sheet 2. These members 5 are merely stamped from the body of the sheet, but it is important to note that all of these stampings open toward the same end of the sheet. During the stamping process the members 5 are raised from the plane of the sheet substantially the same distance as the portions 4, and thus provide a series of openings which are adapted to receive portions of the tubing. The members 5 are to lend additional support to the tubing and are therefore positioned in such a manner so as to engage the returned bend portions 6 of the tubing 3. These members 5 also serve to laterally position the tubing upon the sheet during the assembling process.

After the strap-like members 4 and the clip-like members 5 have been formed in the sheet, the serpentine tubing 3 is inserted into the rows of unobstructed openings provided by the members 4. Since the individual members 4 are of sufficient length to provide an opening large enough to receive adjacent passes of the tubing, the tubing can be inserted in these openings as a unit.

Referring now to Fig. 5, I have shown a portion of the tubing 3 in position upon the sheet 2 after the tubing has been inserted in the unobstructed openings provided by the members 4. Adjacent parallel passes 3a of the tubing thus are positioned upon the condenser sheet 2 and pass under the strap-like member 4. The return bend 6 connecting the adjacent parallel passes is received within the opening provided by one of the clip-like members 5 formed at the edge of the sheet.

In Fig. 6 I have illustrated the last step employed in forming my mechanically bonded condenser. This final step includes depressing the member 4 back into the plane of the sheet so as to provide a relatively large area of contact between the parallel passes 3a of the tubing and the member 4. It is this final step of wrapping member 4 tightly around at least half the circumference of the passes 3a which insures that intimate thermal contact will exist between the condenser sheet 2 and the tubing over a substantial area. Also included in this final operation is the step of depressing the clip-like member 5 into retaining engagement with the return bend 6 of the tubing. It is, of course possible, to entirely eliminate the clip-like members 5 from the structure without departing from the spirit of my invention. While the strap-like members 4 are sufficient to support the tubing in place upon the condenser sheet, the clip-like members 5 are included for the purpose of giving additional support to the tubing, and also for assisting in positioning the tubing laterally of the sheet 2. Fig. 6 illustrates this final step with respect to only a portion of the structure, but it is to be understood that all of the strap-like members 4 and the clip-like members 5 are operated upon in the manner described.

It can thus be seen that I have provided a simple and inexpensive method of forming a heat exchange apparatus in which serpentine tubing is mechanically bonded to a sheet of heat-conducting material. The method retains the advantages of simplicity, and at the same time does not sacrifice good thermal contact between the tubing and the sheet. On the contrary, an extremely intimate thermal contact is provided by my new and improved method.

While I have described my invention as being applied to a plate type or sheet type condenser utilized in refrigeration apparatus, it is obvious that the method could be applied equally well to other types of heat exchange apparatus. Therefore, I do not desire my invention to be limited to the particular structure shown and described, and I intend in the appended claims to cover all modifications within the spirit and scope of my invention.

What I claim as new and desire to secure by Letters Patent of the United States is:

1. The method of making a heat exchange apparatus for refrigerators and the like comprising the steps of providing a sheet of heat conducting material and continuous preformed serpentine tubing having a plurality of parallel passes, forming a plurality of rows of parallel strap-like members on said sheet, said members being formed from said sheet and being raised from the plane of said sheet so as to form rows of aligned unobstructed openings between said members and said sheet sufficiently wide to accommodate at least two passes of said tubing, inserting said tubing into said rows of aligned unobstructed openings between said members and said sheet, and thereafter depressing back into the plane of said sheet the portions of said members extending between said passes so as to wrap the remaining portions of said members tightly around at least half the circumference of the adjacent portions of said tubing, whereby said tubing is held in intimate thermal contact with said members and said sheet over a substantial area thereof.

2. The method of making a heat exchange apparatus for refrigerators and the like comprising the steps of providing a sheet of heat conducting material and continuous preformed serpentine tubing having a plurality of parallel passes, forming a plurality of rows of parallel slits in said sheet, raising the portions of said sheet between adjacent slits from the plane of said sheet so as to form strap-like members providing aligned unobstructed openings between said members and said sheet sufficiently wide to accommodate at least two passes of said tubing, inserting said tubing into said aligned unobstructed openings whereby said tubing lies against said sheet and under said strap-like members and thereafter depressing back into the plane of said sheet the portions of said members extending between said passes so as to wrap the remaining portions of said members tightly around at least half the circumference of the adjacent portions of said tubing, whereby said tubing is held in thermal contact with said sheet and said members over a substantial area thereof.

3. The method of making a heat exchange apparatus for refrigerators and the like comprising the steps of providing a sheet of heat conducting material and continuous preformed serpentine tubing having a plurality of parallel passes connected by return bends, forming a plurality of rows of parallel strap-like members on said sheet, said members being formed from said sheet and being raised from the plane of said sheet so as to form rows of aligned unobstructed openings between said members and said sheet sufficiently wide to accommodate at least two passes of said tubing, forming a plurality of clip-like members from said sheet at each of two opposite ends thereof, inserting said tubing into said aligned unobstructed openings whereby said tubing lies against said sheet and under said strap-like members and said return bends lie under said clip-like members, and thereafter depressing back into the plane of said sheet the portions of said members extending between said passes so as to wrap the remaining portions of said members tightly around at least half the circumference of the adjacent portions of said tubing and depressing said clip-like members back into retaining engagement with said return bends, whereby said tubing is held in thermal contact with said strap-like members and said sheet over a substantial area thereof.

4. The method of making a heat exchange apparatus for refrigerators and the like comprising the steps of providing a sheet of heat conducting material and continuous preformed serpentine tubing having a plurality of parallel passes connected by return bends, forming a plurality of rows of parallel slits in said sheet, raising the portions of said sheet between adjacent slits from the plane of said sheet so as to provide aligned unobstructed openings between said raised portions and said sheet of sufficient width to accommodate at least two passes of said tubing, forming a plurality of clip-like members from said sheet at each of two opposite ends thereof, inserting said tubing into said aligned unobstructed openings whereby said tubing lies against said sheet and under said strap-like members and said return bends lie under said clip-like members, and thereafter depressing back into the plane of said sheet the portions of said strap-like members extending between said passes so as to wrap the remaining portions of said members tightly around at least half the circumference of the adjacent portions of said tubing and depressing said clip-like members into retaining engagement with said return bends, whereby said tubing is held in thermal contact with said strap-like members and said sheet over a substantial area thereof.

References Cited in the file of this patent

UNITED STATES PATENTS

| Number | Name | Date |
| --- | --- | --- |
| 1,253,764 | Zahner | Jan. 15, 1918 |
| 1,800,150 | Musgrave et al. | Apr. 7, 1931 |
| 1,903,125 | Modine | Mar. 28, 1933 |
| 1,982,075 | Smith | Nov. 27, 1934 |
| 2,183,159 | Chesley | Dec. 12, 1939 |
| 2,271,437 | Lewis | Jan. 27, 1942 |
| 2,304,126 | Skeel | Dec. 8, 1942 |
| 2,389,965 | Eckel | Nov. 27, 1945 |
| 2,457,009 | Tanner | Dec. 21, 1948 |
| 2,550,512 | Woolrich | Apr. 24, 1951 |
| 2,567,716 | Kritzer | Sept. 11, 1951 |
| 2,602,649 | Goldberg | July 8, 1952 |

FOREIGN PATENTS

| Number | Country | Date |
| --- | --- | --- |
| 113,395 | Australia | July 1, 1941 |